US011991814B1

(12) United States Patent
Zani et al.

(10) Patent No.: US 11,991,814 B1
(45) Date of Patent: May 21, 2024

(54) PULSED ION BEAM TO PULSED NEUTRAL PARTICLE BEAM SLOW WAVE CONVERTER DEVICE AND METHOD FOR USE THEREOF

(71) Applicant: NexGen Semi Holding, Inc., San Juan Capistrano, CA (US)

(72) Inventors: Michael J. Zani, Laguna Niguel, CA (US); Mark Bennahmias, Mission Viejo, CA (US)

(73) Assignee: NexGen Semi Holding, Inc., San Juan Capistrano, CA (US)

( * ) Notice: Subject to any disclaimer, the term of this patent is extended or adjusted under 35 U.S.C. 154(b) by 430 days.

(21) Appl. No.: 16/880,631

(22) Filed: May 21, 2020

Related U.S. Application Data

(60) Provisional application No. 62/851,038, filed on May 21, 2019.

(51) Int. Cl.
*H05H 3/06* (2006.01)

(52) U.S. Cl.
CPC .................................... *H05H 3/06* (2013.01)

(58) Field of Classification Search
None
See application file for complete search history.

(56) References Cited

U.S. PATENT DOCUMENTS

| | | | | |
|---|---|---|---|---|
| 3,116,433 A * | 12/1963 | Moncrieff-Yeates | H05H 3/02 | 315/111.01 |
| 4,401,618 A * | 8/1983 | Salisbury | G21B 1/23 | 376/106 |
| 4,749,857 A * | 6/1988 | Druaux | G21K 1/14 | 250/251 |
| 5,198,677 A * | 3/1993 | Leung | H01J 27/14 | 250/423 R |
| 2003/0042411 A1* | 3/2003 | Leung | H01J 37/08 | 250/251 |

OTHER PUBLICATIONS

H. Riege, "Neutralization principles for the extraction and transportof ion beams", 451 Nuclear Instruments and Methods in Physics Research A 394 (2000) (Year: 2000).*

* cited by examiner

*Primary Examiner* — James Choi
(74) *Attorney, Agent, or Firm* — Stetina Brunda Garred & Brucker

(57) ABSTRACT

Systems and methods of charge-neutralizing charged particle beams are contemplated, wherein an originating beam is transited through a sequence of slow wave recombination chambers and exposed to neutralizing beams while transit therethrough in order to produce a neutral particle beam. These systems and methods may be seen to be especially suitable for use in spacecraft or other ungrounded environments where the removal of excess charge buildup represents a substantial barrier, and when utilized in a directed energy weapon, may greatly increase the rate at which successive beam pulses may be directed against a target or against multiple targets.

29 Claims, 1 Drawing Sheet

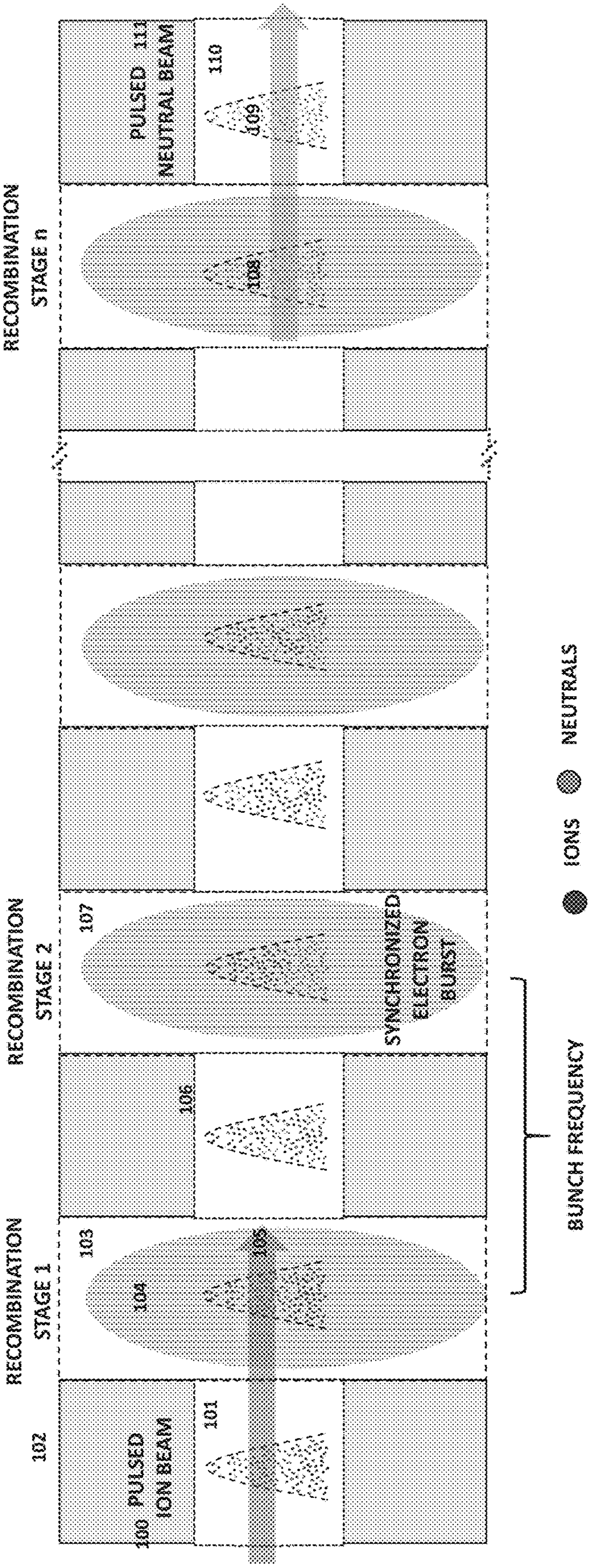
100
PULSED ION BEAM
102
101
RECOMBINATION STAGE 1
103
104
105
106
RECOMBINATION STAGE 2
107
SYNCHRONIZED ELECTRON BURST
BUNCH FREQUENCY
IONS
NEUTRALS
RECOMBINATION STAGE n
108
109
110
PULSED NEUTRAL BEAM
111

PULSED ION BEAM TO PULSED NEUTRAL PARTICLE BEAM SLOW WAVE CONVERTER DEVICE AND METHOD FOR USE THEREOF

CROSS-REFERENCE TO RELATED APPLICATIONS

This application claims the benefit of Provisional Application No. 62/851,038 filed May 21, 2019 and entitled "PULSED ION BEAM TO PULSED NEUTRAL PARTICLE BEAM SLOW WAVE CONVERTER DEVICE AND METHOD FOR USE THEREOF," the entire contents of which is expressly incorporated herein by reference.

STATEMENT RE: FEDERALLY SPONSORED RESEARCH/DEVELOPMENT

This invention was made with government support under Grant Number HQ0147-19-C-7037 awarded by the Missile Defense Agency. The government has certain rights in the invention.

BACKGROUND

1. Technical Field

The present disclosure relates to the art of changing the charge of a charged particle beam. In particular, present disclosure relates to the art of adapting slow wave technology to convert a pulsed source charged particle beam into a pulsed exiting neutral particle beam via charge particle/anti-charge particle (i.e., ion-electron) recombination, supporting the development of a pulsed neutral particle beam weapon in space.

2. Related Art

A particle beam is a stream of charged or neutral particles, in many cases moving at or near the speed of light. At lower kinetic energies, many particle beams such as electron beams and ion beams have seen widespread use in society, such as the electron beams produced by an electron gun in a cathode ray tube. At higher kinetic energies, particle beam technology is used for physics research, especially in particle colliders and synchrotrons. High kinetic energy particle beams have also been applied to modern forms of external beam radiotherapy, principally for treatment of cancer, as they have been found to be superior to x-rays in many respects. Higher kinetic energy particle beams have also been used as ion implanters for doping silicon wafers to form semiconductors during the process of manufacturing integrated circuits. However, there has perhaps been no area of interest in high kinetic energy particle beam technology most intense than potential military applications, especially in the potential use of the technology in outer space.

As discussed in U.S. Pat. No. 5,177,358 to Roberts et al., neutral particle beams have several inherent properties that make them very attractive for use in outer space when compared to charged particle beams. High energy neutral particles will propagate in straight lines unaffected by the magnetic field of the Earth or other interstellar bodies or objects, and have very brief flight times to targets even at extended ranges. Additionally, upon interaction with the surface of a target, neutral particles become high energy charged particles and penetrate deeply, rendering many forms of shielding relatively useless. Because of these advantages, satellite or other spacecraft-based high energy neutral particle beams have been proposed for use against missiles or other targets as early as 1974. A neutral particle beam is capable of rapidly heating a target by ionization or other processes (including nuclear processes and neutron generation when a target may contain fissile material), which may be sufficient to produce a "kill" on a missile in a number of possible ways. Disruption of the aerodynamics or thermal resistance of the hull of a reentry vehicle may result in subsequent destruction during atmospheric reentry. Disruption of the electronic systems of a missile may be sufficient to produce a kill as well. A sufficiently powerful neutral particle beam may also be capable of causing detonation in a chemical explosive, which may be the principal payload of a conventional warhead or the trigger explosive of a nuclear warhead.

Currently, the process of producing a neutral particle beam requires charge neutralization of a charged particle beam, which is generally achieved by the source charge beam particles being surrounded by an equal density of opposite-charge particles. Examples of such systems and techniques are discussed in, for example, U.S. Pat. No. 5,531,420 to Benveniste, U.S. Pat. No. 6,329,650 to Dudnikov, U.S. Pat. No. 7,067,821 to Barnard et al., or U.S. Pat. No. 7,800,983 to Vanderberg et al. This technique may be applied to a space-based system by flooding the source charge particle pulse with a cloud of opposite charged particles for several microseconds as it exits the neutral particle beam system, thus effectively forming a plasma burst that can shield out magnetic fields as the charge neutral plasma shot travels through space.

However, compensation for charge loss with this neutralization process requires an overabundance of opposite-charge particles to be flooded into the exit compartment of the spacecraft, which will have a tendency to adversely charge the entire shell of the spacecraft, effectively shutting the weapon down and preventing the weapon from delivering successive output beam pulses until sufficient time that the spacecraft charging has had a chance to bleed away or be discharged. This may be seen to greatly increase the rate at which successive beam pulses may be delivered to the target or against multiple targets, such as the separate warheads of a MIRV missile payload, inherently limiting the potential utility of any such system.

Therefore, it may be seen that there is a need in the art for improved charge neutralization systems and techniques that improve upon and eliminate the deficiencies of prior art systems, and would permit the manufacture and use of high energy, high current, and high repetition rate pulsed source charge particle beam within a compact, energy efficient design, rapid fire charged particle beam optics column architecture.

BRIEF SUMMARY

To solve these and other problems, a method of charge neutralizing a charged particle beam is contemplated, the method comprising the steps of providing an originating beam, the originating beam comprising charged particles, introducing the originating beam into a first recombination chamber of a slow wave device, the originating beam being configured to transit the first recombination chamber in a first direction of transit, and within the first recombination chamber of the slow wave device, directing upon the originating beam a first neutralizing beam comprising opposite charged particles having an unlike charge to the charged particles of the originating beam, the first neutralizing beam being configured to transit the first recombination chamber in a second direction of transit, the cross sections of the originating beam and the first neutralizing beam at least partially overlapping.

The charged particles of the originating beam may be chosen from: photons, ions, protons, positrons, electrons, fermions, bosons, hadrons, atomic nuclei, baryons, mesons, or combinations thereof. The opposite charged particles of the first neutralizing beam may be chosen from: photons, ions, protons, positrons, electrons, fermions, bosons, hadrons, atomic nuclei, baryons, mesons, or combinations thereof. The second direction of transit may be substantially transverse to the first direction of transit, or may be substantially opposite to the first direction of transit, or may be substantially in line with the first direction of transit.

The originating beam may comprise periodic pulses of charged particles, or may comprise a continuous stream of charged particles. The first neutralizing beam may comprise a burst of opposite charged particles, or may comprise a continuous stream of opposite charged particles. The originating beam may also comprise periodic pulses of charged particles having a period, with the first neutralizing beam comprising a series of bursts of opposite charged particle, each burst within the series being emitted at an interval substantially the same as the period of the pulses of charged particles of the originating beam.

It is further contemplated that the method of neutralizing a charged particle beam may further comprise the additional steps of introducing the originating beam into a second recombination chamber, the originating beam being configured to transit the second recombination chamber in a third direction of transit, and within the second recombination chamber, directing upon the originating beam a second neutralizing beam comprising opposite charged particles having an unlike charge to the charged particles of the originating beam, the second neutralizing beam being configured to transit the second recombination chamber in a fourth direction of transit, the cross sections of the originating beam and the second neutralizing beam at least partially overlapping.

It is contemplated that the herein disclosed methods may be operative to fractionally neutralize the charged particles of the originating beam, or to substantially completely neutralize the charged particles of the originating beam, or to produce a desired output charge of the originating beam, or to produce a desired output energy of the originating beam. Where charged particles of the originating beam comprise atoms, it is also contemplated that methods contemplated herein may be operative to produce a desired output orbital electron configuration of the atoms of the originating beam or a desired beam propagation direction of the atoms of the originating beam.

A method of charge neutralizing a pulsed ion beam is also contemplated, the method comprising the steps of providing an originating beam comprising periodic pulses of ions, providing one or more slow wave devices, the one or more slow wave devices comprising one or more recombination chambers, transiting the originating beam through the successive ones of the one or more recombination chambers, wherein for each recombination chamber, the originating beam is configured to transit that recombination chamber in a respective first direction of transit, and within each respective one of the one or more recombination chambers, directing upon the originating beam a respective neutralizing beam configured to transit that recombination chamber in a respective second direction of transit substantially transverse to the respective first direction of transit, each respective neutralizing beam comprising electrons.

A system for charge-neutralizing a charged particle beam is also contemplated, the system comprising at least one slow wave device, the at least one slow wave device comprising at least one recombination chamber configured to receive an originating beam comprising charged particles, the at least one recombination chamber being configured such that the charged particle beam transits the at least one recombination chamber in a first direction of transit, and at least one emitter, the at least one emitter being configured to emit a neutralizing beam transiting at least one recombination chamber in a second direction of transit, the neutralizing beam comprising opposite charged particles having an unlike charge to the charged particles of the originating beam, wherein within the at least one recombination chamber, the at least one recombination chamber and the at least one emitter is configured so that the cross sections of the originating beam and at least one neutralizing beam at least partially overlap.

The present disclosure will be best understood by reference to the following detailed description when read in conjunction with the accompany drawing.

BRIEF DESCRIPTION OF THE DRAWINGS

These and other features and advantages of the various embodiments disclosed herein will be better understood with respect to the following description and drawing, in which:

FIG. 1 is schematic illustrating a method of charge neutralizing a charged particle beam according to an exemplary embodiment of the present disclosure having multiple recombination stages.

Common reference numerals are used throughout the drawings and the detailed description to indicate the same elements.

DETAILED DESCRIPTION

According to various aspects of the present disclosure, systems and methods of charge-neutralizing charged particle beams are contemplated, wherein an originating beam is transited through a sequence of slow wave recombination chambers and exposed to neutralizing beams while transit therethrough in order to produce a neutral particle beam. These systems and methods may be seen to be especially suitable for use in the vacuum of space or in other environments where expeditious removal of excess charge buildup may represent a substantial barrier, and when utilized in a space-based directed energy weapon, may greatly increase the rate at which successive beam pulses may be directed against a target or against multiple targets.

Referring now to FIG. 1, an exemplary embodiment of the present disclosure illustrates the input a stream of periodic pulses of ions 100 which passes through a first aperture 101 of a slow wave device 102 into a first recombination chamber 103. During the transit time of each charged particle bunch 100 through the recombination chamber, a controlled burst of electrons 104 are emitted transverse to the direction of flow 105 of the bunched ion beam, and a result, some of the ions will capture a nearby electron and undergo ion-electron recombination, converting these ions into neutral particles. The partially neutralized beam may then then pass through a second aperture 106 into a second recombination chamber 107. The neutralization process may be repeated during the transit time of the ion pulse through the second recombination chamber 107 by emitting a controlled burst of electrons 104 transverse to the direction of flow 105, where further ions will be converted to neutral particles. The slow wave neutralization process repeats itself through additional recombination chambers in the device 102 multiple times until substantially every ion within each pulse has been converted to a neutral particle 108. The beam 109 exiting through the last aperture of the device 110 may then be seen to comprise of a periodic stream of neutral particle pulses 111.

While the exemplary embodiment relates to charge neutralization of a pulsed ion beam, it may be seen that the originating beam to be charge neutralized may not be limited to ions, but may comprise any stream of atomic or subatomic charged particles with charge, including but not limited to photons (which for most classical models of physics and for most purposes are considered to be chargeless, but while propagating in magnetized vacuum in very certain energy states such as those which may be encountered in a spacecraft-mounted directed energy weapon, have been observed to interact with the virtual electron-positron field and thus may behave as a charge particle, and will be considered a "charged particle" for purposes of this disclosure), ions, protons, positrons, electrons, fermions, bosons, hadrons, atomic nuclei, baryons, and mesons. Furthermore, the originating beam may not necessarily be a pulsed beam comprising periodic pulses of charged particles, but may also be a continuous beam comprising a continuous stream of charged particles.

Likewise, it may be seen that the neutralizing beam may not be limited to electrons, but may comprise any opposite charged particles which have an unlike charge to the charged particles of the originating beam, including but not limited to photons (which have a very minute charge), ions, protons, positrons, electrons, fermions, bosons, hadrons, atomic nuclei, baryons, and mesons. The opposite charged particles may also be particles having an unlike charge of the same magnitude, or may be particles having an unlike charge of different magnitudes. Furthermore, the neutralizing beam may not necessarily be emitted as a controlled burst, but may be emitted as a pulsed beam comprising periodic pulses of charged particles, or may be emitted as a continuous beam comprising a continuous stream of charged particles.

In embodiments in which the originating beam is a pulsed beam comprising periodic pulses of charged particles, it is contemplated that bursts of opposite charged particles may be emitted from the neutralizing beam with the same period as the pulses of the charged particles of the originating beam, such that each pulse of charged particles of the originating beam is exposed to a corresponding pulse of opposite charge particles emitted by the neutralizing beam. It may further be seen that in embodiments in which the originating beam comprises periodic pulses of charged particles and transits multiple recombination chambers, the originating beam may be exposed to a neutralizing beam within each of those recombination chambers, with each of those neutralizing beams being configured to emit bursts of opposite charged particles with the same period as the pulses of the charged particles of the originating beam, but with the phases of each neutralizing beam offset such that each pulse of the originating beam is exposed to and receives a burst of charged particles as it transits that respective recombination chamber.

It may also be seen that multiple neutralizing beams may transit and intersect with the originating beam within a single recombination chamber, and that with use of multiple neutralizing beams in any embodiment, the timing and/or outputs of those neutralizing beams may be adjusted in order to adjust the resulting final parameters of the originating beam following transit through the recombination chamber (s). Furthermore, it may be seen that the timing of the any specific emission of a burst of opposite charged particles of the neutralizing beam may not only be configured to maximize intersection with the pulses of charged particles transiting the recombination chamber and the resulting recombination events, as in the exemplary embodiment, but that timing may also be configured to only result in overlap of the burst of opposite charged particles with only portions of the pulses of charged particles transiting the recombination chambers, which may be seen to result in recombination occurring only within a portion of the pulse of charged particles. Embodiments are also contemplated where only some pulses of charged particles may be exposed to opposite charged particles within a recombination chamber, such as every other pulse.

Furthermore, it may be appreciated that in embodiments of the present disclosure, complete charge neutralization of the originating beam may not be required, but fractional neutralization of the originating beam may be accomplished as well, and that the ultimate resulting charge modulated beam may have, in addition to a neutral charge as in the exemplary embodiment, a positive charge or negative charge of any particular magnitude. For example, it is specifically contemplated that in most embodiments a single exposure to burst of opposite charged particles from a single neutralizing beam within a single recombination chamber may not be sufficient to fully neutralize a pulse of charged particles, but merely to only result in fractional neutralization. As such, it is contemplated in those embodiments that the originating beam may transit through multiple recombination chambers, each having its own neutralizing beam transiting therethrough to accomplish total or near-total neutralization of each pulse via successive fractional neutralizations. It may also be seen that this process of total or near-total neutralization (or charge modulation to any desired charge state) via successive fractional naturalizations may also be accomplished by via exposing each pulse of charged particles of the neutralizing beam to successive bursts of opposite charged particles within the same recombination chamber, such as via multiple neutralizing beams which transit that recombination chamber, or by repeated transit of a single originating beam thorough the same recombination chamber.

Within the recombination chambers, it is contemplated in the exemplary embodiment the neutralizing beam is configured to emit bursts of opposite charged particles in a transverse direction to the direction of transit of the charged particles of the originating beam, whereupon the charged particles of the originating beam may be reduced to a lesser charge by cross sectional proximity collision with the opposite charged particles of the neutralizing beam. However, it may also be seen that in other embodiments, the neutralizing beam may be configured to travel in line with, opposite to, adjacent to, or at any angle with respect to the direction of transit of the originating beam, which may include only partial intersections of the path of transit of the neutralizing beam with the path of transit of the originating beam, all of which may result in a change in the resulting parameters of the ultimate charge-modulated originating beam.

It may also be seen that it may be desirable to produce an output beam with a controlled energy output at a level that is not 0 eV (neutral), but rather may be close to neutral, or which may have an energy spread around a target energy, without requiring precision, or which is specifically controlled to have a level of inherent imprecision or deviance from a target output charge. For example, the output beam may be desired to have an arbitrary, random, or weighted output energy within the range of 0 eV+/−0.1% or other ranges, or the output beam may be output at other charge states, such as 1 eV instead of 0 eV, or combinations of these concepts. Likewise, beyond merely recombining the charge vacancy to produce a neutral output beam, a desired orbital configuration may be achieved in the output beam, in addition to or as an alternative to achieving an output beam that has its ultimate charge (or lack thereof) as a sole target. Further, it may be seen that a desired beam propagation direction may be a criteria of a desired output beam, in addition to or as an alternative to any of the above criteria.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A method of transforming a bunched charged particle beam into a bunched neutral particle beam, the method comprising the steps of:

providing an originating beam, the originating beam comprising periodic pulses of bunched charged particles defining a period;

introducing the originating beam into a first recombination chamber of a slow wave device, the originating beam being configured to transit the first recombination chamber in a first direction of transit; and within the first recombination chamber of the slow wave device, directing upon the originating beam a first pulsed neutralizing beam comprising periodic pulses of bunched opposite charged particles having an unlike charge to the charged particles of the originating beam, the first pulsed neutralizing beam being configured to transit the first recombination chamber in a second direction of transit, the cross sections of the originating beam and the first pulsed neutralizing beam at least partially overlapping;

introducing the originating beam into a second recombination chamber, the originating beam being configured to transit the second recombination chamber in a third direction of transit; and within the second recombination chamber, directing upon the originating beam a second pulsed neutralizing beam comprising periodic pulses of bunched opposite charged particles having an unlike charge to the charged particles of the originating beam, the second neutralizing beam being configured to transit the second recombination chamber in a fourth direction of transit, the cross sections of the originating beam and the second neutralizing beam at least partially overlapping;

wherein the periodic pulses of bunched opposite charged particles of the first and second pulsed neutralizing beam are emitted at an interval substantially the same as, or a harmonic of, the period of the pulses of charged particles of the originating beam.

2. The method of claim 1, wherein the charged particles of the originating beam are chosen from: ions, protons, positrons, electrons, fermions, bosons, hadrons, atomic nuclei, baryons, mesons, or combinations thereof.

3. The method of claim 1, wherein the opposite charged particles of the first neutralizing beam are chosen from: ions, protons, positrons, electrons, fermions, bosons, hadrons, atomic nuclei, baryons, mesons, or combinations thereof.

4. The method of claim 1, wherein the second direction of transit is substantially transverse to the first direction of transit.

5. The method of claim 1, wherein the originating beam is composed of discrete bursts of periodic pulses of charged particles.

6. The method of claim 1, wherein the originating beam comprises a continuous stream of periodic pulses of bunched charged particles.

7. The method of claim 1, wherein the first neutralizing beam is composed of discrete bursts of periodic pulses of opposite charged particles.

8. The method of claim 1, wherein the first neutralizing beam comprises a continuous stream of periodic pulses of bunched opposite charged particles.

9. The method of claim 1, wherein the method is operative to fractionally neutralize the charged particles of the originating beam.

10. The method of claim 1, wherein the method is operative to substantially completely generate neutral particles from the bunched charged particles of the originating beam.

11. The method of claim 1, wherein the method is operative to produce a desired output charge of the bunched charged particles of the originating beam.

12. The method of claim 1, wherein the charged particles of the originating beam comprises atoms, and wherein the method is operative to produce a desired beam propagation direction of the atoms of the originating beam.

13. A method of transforming a bunched ion beam into a bunched neutral particle beam, the method comprising the steps of:

providing an originating beam comprising periodic pulses of bunched ions, the periodic pulses of bunched ions defining a period;

providing one or more slow wave devices, the one or more slow wave devices comprising two or more recombination chambers;

transiting the originating beam through the successive ones of the two or more recombination chambers, wherein for each recombination chamber, the originating beam is configured to transit that recombination chamber in a respective first direction of transit; and within each respective one of the two or more recombination chambers, directing upon the originating beam a respective pulsed neutralizing beam configured to transit that recombination chamber in a respective second direction of transit substantially transverse to the respective first direction of transit, each respective pulsed neutralizing beam comprising periodic pulses of bunched electrons;

wherein the periodic pulses of bunched electrons of each respective pulsed neutralizing beam are emitted at an interval substantially the same as, or a harmonic of, the period of the pulses of bunched ions of the originating beam.

14. The method of claim 13, wherein during transit of the originating beam through the two or more recombination chambers, the timing of the emission of periodic pulses of bunched electrons of each respective pulsed neutralizing beam are configured such that each pulse of ions has directed upon it at least one corresponding burst of electrons emitted from at least one neutralizing beam.

15. The method of claim 13, wherein the opposite charged particles of the respective neutralizing beams are chosen from: ions, protons, positrons, electrons, fermions, bosons, hadrons, atomic nuclei, baryons, mesons, or combinations thereof.

16. The method of claim 13, wherein the method is operative to fractionally neutralize the bunched ions of the originating beam.

17. The method of claim 13, wherein the method is operative to substantially completely neutralize the bunched ions of the originating beam.

18. The method of claim 13, wherein the method is operative to produce a desired output charge of the bunched ions of the originating beam.

19. The method of claim 13, wherein the method is operative to produce a desired beam propagation direction of the bunched ions of the originating beam.

20. A system for charge-neutralizing a bunched charged particle beam, comprising:

at least one slow wave device, the at least one slow wave device comprising at least two recombination chambers configured to receive an originating beam comprising periodic pulses of bunched charged particles defining a period, the at least two recombination chambers being configured such that within each recombination chamber, the periodic pulses of bunched charged particles of the originating beam transits that recombination chamber in a first direction of transit; and at least one emitter within each recombination chamber, the at least one emitter being configured to emit a pulsed neutralizing beam transiting that recombination chamber in a second direction of transit substantially transverse to the first direction of transit, the pulsed neutralizing beam comprising bunches of opposite charged particles having an unlike charge to the charged particles of the originating beam, the at least one emitter being configured to emit the bunches of opposite charged particles at an interval substantially the same as, or a harmonic of, the period of the pulses of charged particles of the originating beam;

wherein within each of the at least two recombination chambers, that recombination chamber and the at least one emitter within that recombination chamber are configured so that the cross sections of the originating beam and the at least one pulsed neutralizing beam at least partially overlap.

21. The system of claim 20, wherein the second direction of transit is substantially orthogonal to the first direction of transit.

22. The system of claim 20, wherein at least one of the emitters is configured to emit a neutralizing beam composed of discrete bursts of periodic pulses of opposite charged particles.

23. The system of claim 20, wherein at least one of the emitters is configured to emit a neutralizing beam comprising a continuous stream of periodic pulses of bunched charged particles.

24. The system of claim 20, wherein the system is operative to fractionally neutralize the bunched charged particles of the originating beam.

25. The system of claim 20, wherein the system is operative to substantially completely generate neutral particles from the bunched charged particles of the originating beam.

26. The system of claim 20, wherein the system is operative to produce a desired output charge of the bunched charged particles of the originating beam.

27. The system of claim 20, wherein the originating beam comprises atoms, and wherein the system is operative to produce a desired beam propagation direction of the atoms of the originating beam.

28. The method of claim 1, wherein at least one of the first or second pulsed neutralizing beam comprises pulsed photons of neutral charge.

29. The method of claim 1, wherein the periodic pulses of bunched opposite charged particles of at least one of the first or second pulsed neutralizing beam are emitted at a phase that is offset from the phase of the periodic pulses of charged particles of the originating beam such that each periodic pulse of bunched charged particles of the originating beam is exposed to and receives a corresponding periodic burst of bunched opposite charged particles of at least one of the first or second pulsed neutralizing beam as it transits at least one of the first or second recombination chamber.

* * * * *